US006813651B1

(12) United States Patent
Smith et al.

(10) Patent No.: US 6,813,651 B1
(45) Date of Patent: Nov. 2, 2004

(54) INTERFACE DEVICE FOR ETHERNET TRANSCEIVER AND 1394 CONTROLLER

(75) Inventors: Michael A. Smith, Boulder Creek, CA (US); Chang-Chi Liu, Fremont, CA (US)

(73) Assignee: ControlNet, Inc., Campbell, CA (US)

( * ) Notice: Subject to any disclaimer, the term of this patent is extended or adjusted under 35 U.S.C. 154(b) by 299 days.

(21) Appl. No.: 09/789,364

(22) Filed: Feb. 20, 2001

Related U.S. Application Data

(60) Provisional application No. 60/183,763, filed on Feb. 18, 2000.

(51) Int. Cl.[7] .................................................. G06F 3/00
(52) U.S. Cl. ............................. 710/20; 710/33; 710/52
(58) Field of Search .............................. 710/1, 18, 20, 710/33, 61, 36, 129; 712/225, 29; 370/465; 713/500, 600; 709/223, 248, 329

(56) References Cited

U.S. PATENT DOCUMENTS

| | | | | |
|---|---|---|---|---|
| 6,061,746 A | * | 5/2000 | Stanley et al. | 710/10 |
| 6,131,125 A | * | 10/2000 | Rostoker et al. | 709/250 |
| 6,185,607 B1 | * | 2/2001 | Lo et al. | 709/213 |
| 6,345,315 B1 | * | 2/2002 | Mishra | 709/329 |
| 6,370,603 B1 | * | 4/2002 | Silverman et al. | 710/72 |
| 6,584,536 B1 | * | 6/2003 | Deng | 710/310 |
| 6,600,755 B1 | * | 7/2003 | Overs et al. | 370/465 |
| 6,604,206 B2 | * | 8/2003 | Chadha et al. | 713/401 |

OTHER PUBLICATIONS

The Authoritative Dictionary of IEEE Standards Terms; 2000; IEEE Press; Seventh Edition.*
John and Smith; Application–Specific Integrated Circuits; 1997; Addison–Wesley; 2nd printing.*
webopedia.com–>keyword: OSI, reference file: The 7 layers of the OSI Model.*
www.microsoft.com, reference title: OSI Model.*

\* cited by examiner

*Primary Examiner*—Jeffrey Gaffin
*Assistant Examiner*—Alan Chen
(74) *Attorney, Agent, or Firm*—Beyer Weaver & Thomas LLP

(57) ABSTRACT

An interface device allows communication between a 1394 device and an Ethernet via an 802.3 PHY. To the 1394 link, the device appears as a 1394 PHY, to the 802.3 PHY, the device appears as an 802.3 MAC. The interface device includes a 1394 PHY-link link interface, a Gigabyte Media Independent Interface (GMII), checksum padding and checksum stripping units, emulated 1394 PHY registers, and a clock generation unit. The interface device uses two clocks to supply timing clocks for the 1394 link and for the 802.3 PHY. For speed matching, the interface device matches the data rate of the link (S100, S200, S400, S800) with the PHY (nominally 1 Gbps) using a padding algorithm. The interface device provides the link with management information through a set of IEEE 1394 compatible registers that are accessed through the 1394 interface, emulating a single port 1394 PHY. The interface device also manages the IEEE 802.3 PHY as would a MAC through the MDC/MDIO interface.

6 Claims, 13 Drawing Sheets

1394 Network

Computer

| Name | Type | I/O | Description |
|---|---|---|---|
| PHY_LINlinkK Interface ||||
| PL_CTL(1:0) | TTL | I/O | Control I/O's. Ref Clock: SCLK50M↑ |
| PL_D0-D7 | TTL | I/O | PHY-Link Interface Data Ref Clock: SCLK50M↑ |
| PL_LREQ | TTL | I | Link Request. Ref Clock: SCLK50M↑ |
| PL_PHYID5-0 | TTL | I | Select PHYID manually. |
| PL_ROOT | TTL | I | Select the PHY to be root |
| PL_CHLD | TTL | I | Select the PHY to be a child |
| GMII7PMA Symbol ||||
| TXD7-0/TXCG7-0 | TTL | O | Ref. Clock: TCLK |
| TXEN/YXCG8 | TTL | O | Ref. Clock: TCLK |
| TXER/TXCG9 | TTL | O | Ref. Clock: TCLK |
| TXLK/TCLK | TTL | O | |
| RXD7-0 | TTL | I | Ref. Clock: RCLK |
| COL/RCLK0 | TTL | I | |
| RXER/RXCG8 | TTL | I | Ref. Clock: RCLK |
| RXDV/RXCG9 | TTL | I | Ref. Clock: RCLK |
| RXC;L/RCLK1 | TTL | I | |
| CRS/SDT | TTL | I | |
| Miscellaneous ||||
| CLK125M | | I | Oscillator Input |
| SCLK50M | | O | 50MHz for PHY/LINK IF |
| LINKSPD | | I | 11: S100; 10: S200; 1: 5400; 0:S800 |
| IFS | | I | Interface Selection: 1:GMII; 0:OTHER |
| RESET | | I | Active Low. |

FIG. 6

| Address | Bit Position | | | | | | | |
|---|---|---|---|---|---|---|---|---|
| | 0 | 1 | 2 | 3 | 4 | 5 | 6 | 7 |
| 0000 | Phy_ID(PPPPPP) | | | | | | R(P) | CPS(1) |
| 0001 | RHB | IBR | gap_cnt | | | | | |
| 0010 | Extended (111) | | | 0 | Number_ports (0011 | | | |
| 0011 | Sp(010) | | | 0 | Delay(0000) | | | |
| 0100 | L | C | Jitter(000) | | | PWR | | |
| 0101 | RPIE | ISBR | CTOI | CPSI | STOI | PEI | EAA | EMC |
| 0110 | Reserved | | | | | | | |
| 0111 | Page_select | | | 0 | Port_select | | | |

FIG. 7
Base Registers

| Address | Bit Position | | | | | | | |
|---|---|---|---|---|---|---|---|---|
| | 0 | 1 | 2 | 3 | 4 | 5 | 6 | 7 |
| 1000 | Astat | | Bstat | | Ch | Con | Bias | Dis |
| 1001 | Peer Speed | | | Pie | Fault | Reserved | | |
| 1010 | Reserved | | | | | | | |
| 1011 | Reserved | | | | | | | |
| 1100 | Reserved | | | | | | | |
| 1101 | Reserved | | | | | | | |
| 1110 | Reserved | | | | | | | |
| 1111 | Reserved | | | | | | | |

FIG. 9
Port Status Registers

| Field | Size | Type | Value | Description |
|---|---|---|---|---|
| Physical_ID | 6 | R | 6'h00 | Self_ID bits 2-7. These are set by the Tree_ID process. For point-to-point connections the only allowable values will be 6'h00 and 6'h01. |
| R | 1 | R | 0 | Root - Determine by the Tree-ID process. For point-to-point connections this bit will be the inverse of the Child bit in the Port Register page |
| PS | 1 | R | 1 | Cable Power Active - Shall be set to 1 |
| IBR | 1 | R/W | 0 | Set by software to attempt to become Root during the next Tree-ID process<br><br>0 - Do not attempt to become Root<br>1- Attempt to become Root by holding off on arbitration |
| IBR | 1 | R/W | 0 | Initiate Bus Reset without respect to arbitration. This bit is self clearing. Reset to '0' by h/w reset and bus reset |
| Gap_count | 6 | R/W | 6'h3F | Self-ID bits 10-15 |
| Extended | 3 | R | 3'h7 | Extended Register Set |
| Total_ports | 5 | R | 5'h01 | Indicates 102 is a single port device |
| Max_speed | 3 | R | 3'h2 | Indicates 102 is capable of S400 (and below) operations. Self-ID bits 16-17 |
| Delay | 4 | R | 4'h0 | Indicates 102 meets the minimum delay requirements of 1394a |
| LCtrl | 1 | R/W | 1 | Self-ID bit 8 |
| Contender | 1 | R/W | | X, Reset to '0', self-ID bit 20 |
| Jitter | 3 | R | 3'h0 | Indicates 102 meets the minimum jitter requirements of 1394a |
| Pwr_class | 3 | R/W | 3'h0 | Self-ID bits 21-23 |
| Watchdog | 1 | R | 0 | Watchdog Enable. Controls whether or not Loop, Power Fail and Time-out interrupts are reported to the Link when the Interface is not operational. |
| ISBR | 1 | R | 0 | Initiate Short Bus Reset. Setting this bit causes the device to initiate a Short Bus Reset. (i.e. - arbitrated) This bit is self clearing. |
| Loop | 1 | R | 0 | Loop - This bit indicates a Loop condition in the topology. As Loops are not possible in a point-to-point connection this bit will always read 0. |
| Pwr_fail | 1 | R | 1 | Power Fail. Indicates Power Failure on the cable. This bit is reset to 1. A write of 1 to this bit causes the bit to be reset to 0. Does not source or sink power and will not set this bit to a 1 under any conditions. This bit is included for compatibility with the 1394a specification only. |
| Timeout | 1 | R/W | 0 | Time out. Indicates a time out condition on the cable. A write of 1 to this bit causes the bit to be reset to 0. 102 does not measure any form of bus time out and will not set this bit to 1 under any conditions.. This bit is included for compatibility with the 1394a specification only. |

FIG. 8A
Base Registers Field Descriptions

| Field | Size | Type | Value | Description |
|---|---|---|---|---|
| Port_event | 1 | R/W | 0 | Port event. This bit is set to 1 when 102 determines that BIAS, CONNECTED, DISABLED or FAULT change state and the INT_ENABLE bit is set. A write of 1 causes this bit to be reset to 0. |
| Enable_accel | 1 | R/W | 0 | Enable Accelerations. No effect on 102. This bit may be set and reset by software to imply compatibility with the 1394a specification. Fly-By Acceleration is not applicable to a point-to-point bus configuration |
| Enable_multi | 1 | R/W | 0 | Enable Multi-speed packet concatenation. |
| Page_select | 3 | R/W | 3'h0 | Page Select. Selects which of the eight possible Phy Register Port pages are accessible through the window at Phy register addresses 4'hF. |
| Port_select | 4 | R/W | 4'h0 | Port Select. Not applicable. 102 is a single port device. All reads in the register page are to Port 0. |

FIG. 8B
Base Registers Field Descriptions

| Field | Size | Type | Value | Description |
|---|---|---|---|---|
| Astat | 2 | R | 11b | Set to 2'b11 indicating Z |
| Bstat | 2 | R | 11B | Set to 2'b11 indicating Z |
| Child | 1 | R | 0 | 0 determined it was the Root device<br>1 determined that it was the Child device |
| Connected | 1 | R | 0 | Copy of SIG_DET input from SerDes chip.<br>0 - Disconnected<br>1 - Connected |
| Bias | 1 | R | 0 | Copy of Connected bit.<br>0 - No BIAS<br>1 - Bias Detected |
| Disabled | 1 | R/W | 0 | Port Disable bit.<br>0 - Port is enabled for operation<br>1 - Port is disabled for operation |
| Negotiated Speed | 3 | R | 000 | Speed negotiated between 102 and the device at the other end of the cable.<br>000 - BIAS == 0<br>010 - S400 if BIAS == 1 |
| Interrupt Enable | 1 | R/W | 0 | Port Interrupt Enable<br>0 - Port events will not create an interrupt<br>1 - Port events will create an interrupt |
| Fault | 1 | R | 0 | Suspend/Resume Fault<br>0 does not support Suspend/Resume. No faults detectable. |

FIG. 10
Port 0 Register Definition

| Address | Bit Position | | | | | | | |
|---|---|---|---|---|---|---|---|---|
| | 0 | 1 | 2 | 3 | 4 | 5 | 6 | 7 |
| 1000 | 0h | | | | 1h | | | |
| 1001 | Reserved | | | | | | | |
| 1010 | 0h | | | | 8h | | | |
| 1011 | 0h | | | | 0h | | | |
| 1100 | 2h | | | | 8h | | | |
| 1101 | 0h | | | | 0h | | | |
| 1110 | 0h | | | | 0h | | | |
| 1111 | 0h | | | | 0h | | | |

FIG. 11
Vendor ID Register (Page 1)

| Address | Bit Position | | | | | | | |
|---|---|---|---|---|---|---|---|---|
| | 0 | 1 | 2 | 3 | 4 | 5 | 6 | 7 |
| 1000 | NPA | Reserved | | | | | Link_Speed | |
| 1001 | Reserved for Test. | | | | | | | |
| 1010 | | | | | | | | |
| 1011 | | | | | | | | |
| 1100 | | | | | | | | |
| 1101 | | | | | | | | |
| 1110 | | | | | | | | |
| 1111 | | | | | | | | |

FIG. 12
Vendor ID Register (Page 7)

| Field | Size | Type | Value in b |
|---|---|---|---|
| NPA | 1 | R/W | Reset to "0" by hardware reset. Unaffected by bus reset |
| Link_Speed | 2 | R | Set to '10' hardware reset. Unaffected by bus reset. |

FIG. 13
Vendor ID Register Field Descriptions

Clock Generation

Phase Relationship

Skewing

FIG. 17
Root Self-ID Packet

| 10 | PHY ID | 0 | L | GAP Count | Sp | RSV | C | PWR | P0 | P1 | P2 | I | M |
|----|--------|---|---|-----------|-----|-----|---|-----|----|----|----|---|---|
| 10 | 000001 | 0 | 1 | 111111    | 10  | 00  | 1 | 000 | 10 | 01 | 01 | 1 | 0 |

FIG. 18
Non-Root Self-ID Packet

| 10 | PHY ID | 0 | L | GAP Count | Sp | RSV | C | PWR | P0 | P1 | P2 | I | M |
|----|--------|---|---|-----------|-----|-----|---|-----|----|----|----|---|---|
| 10 | 000001 | 0 | 1 | 111111    | 10  | XX  | 1 | 000 | 11 | 01 | 01 | 1 | 0 |

FIG. 19
Root Self-ID Packet

| 10 | PHY ID | 0 | L | GAP Count | Sp | RSV | C | PWR | P0 | P1 | P2 | I | M |
|----|--------|---|---|-----------|-----|-----|---|-----|----|----|----|---|---|
| 10 | 000001 | 0 | 1 | 111111    | 10  | 00  | 1 | 000 | 10 | 01 | 01 | 1 | 0 |

Example Pinout of Interface Device

INTERFACE DEVICE FOR ETHERNET TRANSCEIVER AND 1394 CONTROLLER

This application claims priority of U.S. provisional patent application No. 60/183,763, filed Feb. 18, 2000, entitled "Interface Device Between Ethernet Transceiver and 1394 Controller," which is hereby incorporated by reference.

FIELD OF THE INVENTION

The present invention relates generally to data communications. More specifically, the Present invention relates to an interface between the 1394 standard and the Ethernet standard.

BACKGROUND OF THE INVENTION

When discussing data communications in general, it can be useful to refer to a model. In an attempt to bring a level of standardization between protocols, the International Standards Organization (ISO) developed the Open Systems Interconnect Model (OSI Model). The model is intended to illustrate the separable functions needed for data communication among computers and devices. The Model is helpful in understanding the data communication process in terms of functions operating at separate layers. Each layer plays a role in getting the data between the source and destination. Although the OSI Model involves seven separate layers, it is true that certain network communication protocols do not share this view. Instead, each protocol may have its own view on the number of layers and the function of each. Nevertheless, a brief review of the OSI Model will be useful as background material.

At the bottom is the physical layer. The physical layer defines the electrical characteristics of the actual connection between network nodes. The next layer up, the data link layer, deals with how the network is shared between nodes. One popular set of standards defines the data link layer as including two levels: the Media Access Control (MAC) level, which sets rules covering when each node on the network can send messages; and the Logical Link Control (LLC) level, which provides a connection-oriented service between nodes.

Next layer up is the network layer which provides routing; it provides addressing information to guide data through the network. The top four layers ($4^{th}$ through $7^{th}$) concern network architecture. The fourth layer, the transport layer, is concerned with end-to-end message transport across the network. The next three layers are related to applications. The session layer is concerned with establishing the commencement and completion of a session between applications. The presentation layer is used to insure that users view incoming information in a set format. Finally, application layer seven is concerned with the interface between the network and the application. Thus, the OSI Model defines an architecture having seven layers: it does not, however, provide or define protocols. Protocols can be established that conform to the OSI Model if desired.

Further relevant background regarding the 1394 standard will now be provided. The 1394 standard set forth by IEEE for implementing the physical, data link and network layers has recently become popular. Original known as FIREWIRE, 1394 is a set of protocols designed for smaller networks, and has been termed a "desktop area network." For example, in a network using 1394, nodes are typically no more than 4½ meters apart and the network is no more than 72 meters in diameter in total. Devices that might have a 1394 interface include digital camcorders, computers, televisions, digital recorders, DVD players, video game consoles, etc. These devices may be connected to one another point-to-point to form a network using the 1394 standard.

Although the 1394 standard is now being used, it does have inherent limitations. It would be desirable to have methods and apparatus that would overcome some of the inherent limitations in the 1394 standard, such as its communication distance, while at the same time providing a more reliable standard.

SUMMARY OF THE INVENTION

To achieve the foregoing, and in accordance with the purpose of the present invention, an interface device is disclosed that provides communication between a 1394 controller and an Ethernet transceiver.

The present invention is advantageous because it allows devices using the 1394 standard to communicate at distances of up to 100 meters by taking advantage of the Ethernet standard. Essentially, the 1394 standard is able to be implemented over Ethernet. By taking advantage of available, inexpensive, and tested Ethernet transceivers, the speed of 1394 is also improved. The present invention allows speeds of from 100 Mbps up to 800 Mbps. Thus, high-speed 1394 applications can be implemented over greater distances using traditional copper twisted-pair wiring. There is an effort underway termed FIBERCHANNEL that seeks to implement 1394 over greater distances, but it must be implemented using fiber optics, and currently has only a top speed of 100 Mbps.

The interface device of the present invention thus allows the interoperation of an IEEE 1394 link layer device with an IEEE 802.3 physical layer device (commonly called a "PHY"). Because these devices were designed for different applications, have different physical interfaces, and operate at different speeds, the interface device provides conversion and emulation to accommodate the two different standards. For example, there are clocking differences to be resolved, data speed differences to be managed, and management requirements to be fulfilled.

To address the clocking issues, the interface device uses two clocks to supply timing clocks for the link (as would a 1394 PHY) and the PHY (as would a 802.3 MAC). For speed matching, the interface device matches the data rate of the link (S100, S200, S400, S800) with the PHY (nominally 1 Gbps) using a padding algorithm. The interface device provides the link with management information through a set of IEEE 1394 compatible registers that are accessed through the 1394 interface, emulating a single port 1394 PHY. The interface device also manages the IEEE 802.3 PHY as would a MAC through the MDC/MDIO interface.

BRIEF DESCRIPTION OF THE DRAWINGS

The invention, together with further advantages thereof, may best be understood by reference to the following description taken in conjunction with the accompanying drawings in which:

FIG. 6 lists pin descriptions for the interface device of FIG. 5.

FIG. 7 illustrates the contents of base registers 0000-0011.

FIG. 8 describes the fields of the base registers of FIG. 7.

FIG. 9 illustrates the contents of port status registers 1000-1111.

FIG. 10 describes the fields of the port 0 register.

FIG. 11 illustrates the contents of the vendor ID register (Page 1).

FIG. 12 illustrates the content of the vendor ID register (Page 7).

FIG. 13 describes the fields of the vendor ID registers.

FIG. 17 illustrates a root self ID packet used after a connection.

FIG. 18 illustrates a non-root self ID packet used after a connection.

FIG. 19 illustrates a root self ID packet sent following a disconnection.

DETAILED DESCRIPTION OF THE INVENTION

Figure 1:
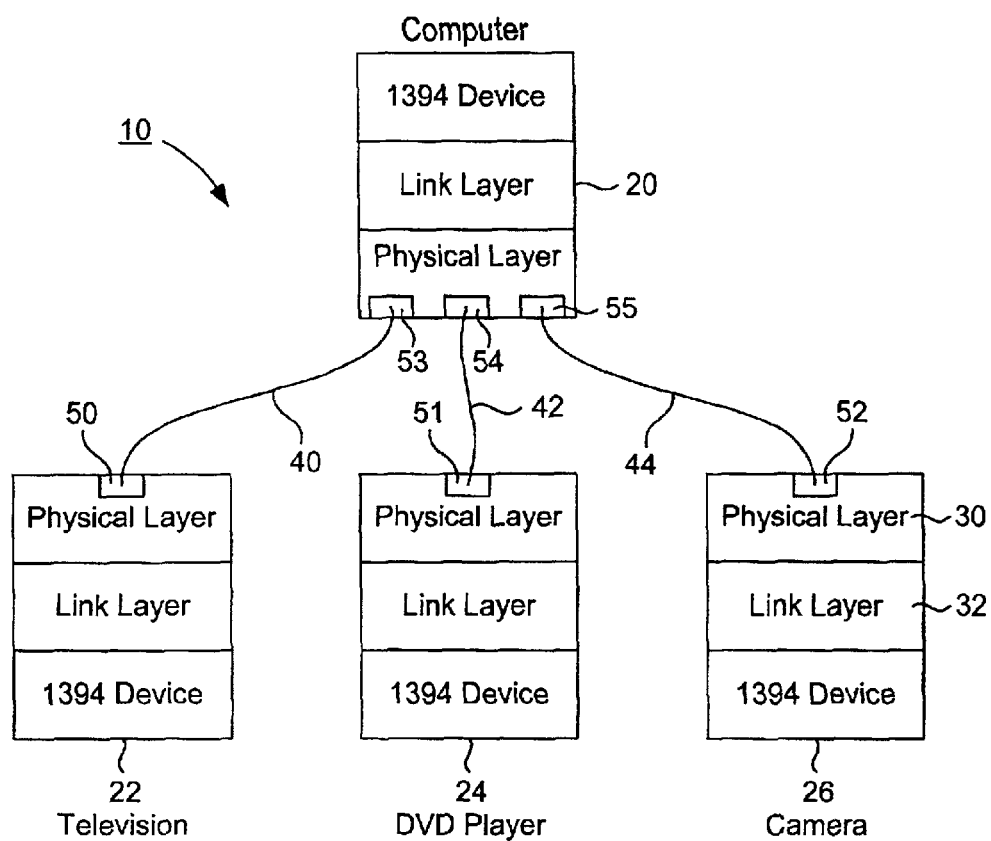
FIG. 1 illustrates an example of a prior art 1394 network that is useful for understanding the present invention.

As previously mentioned, the IEEE 1394 standard defines a serial bus architecture commonly known as FIREWIRE. The FIREWIRE technology was originally developed by Apple Computer and is based upon the international specification ISO/IEC 13213 (ANSI/IEEE 1212). This specification is formally named "Information Technology—Microprocessor Systems—Control and Status registers (CSR) Architecture for Microcomputer Buses" and defines a command set of co-features that can be implemented by a variety of buses. The IEEE 1394 specification defines serial bus extensions to the CSR Architecture.

As used herein, the terms "1394," "1394 device," "1394 interface," "1394 bus," "1394 network," "1394 chip" are all used to broadly cover any implementation that follows a past or developing 1394 specification. For example, the original IEEE 1394 specification was released in 1995 and was termed IEEE 1394-1995. For clarification a supplement has been released termed IEEE P1394a. Further, future versions of the specification EEC 61883-1, IEEE P1 394b and 1394.2 are currently being developed. As used herein, the terms mentioned above are intended to refer to any apparatus or method that follows these specifications or future 1394 specifications. The current IEEE 1394 specification is described in "FIREWIRE System Architecture" by Dawn Anderson, Addison-Wesley, Second Edition 1999. Collectively, these specifications are also referred to as the "1394 standard."

The IEEE 802.3 standard (commonly called the "Ethernet standard") is a protocol that defines a sequence of events for data communication. As is well known in the field, 802.3 are used in local area networks, enterprise networks and wide area networks. Over many years, the standard has evolved and has been improved as problems are identified and solved. As used herein, the terms "802.3," "Ethernet device," "Ethernet bus," "Ethernet network," and "Ethernet transceiver" are all used to broadly cover any implementation that follows a past or developing 802.3 standard. For example, IEEE has published the 802.3 standard, the 802.3z standard, and the 802.3ac and 802.3ab standards. Further, future versions of the standard are being developed. As used herein, the terms mentioned above are intended to refer to any apparatus or method that follows these or future 802.3 standards. Collectively, these standards are also referred to as the "802.3 standard" or the "Ethernet standard."

As has been discussed earlier, the 1394 specification is used to connect 1394 devices to form a 1394 bus. As is used in the art, a 1394 bus is a collection of devices connected together using point-to-point cables. A 1394 device is, in general, any device having a 1394 interface and includes video cameras, camcorders, digital cameras, computers, printers, disk drives, hubs, switches, television sets, video cassette recorders, set top boxes, video game consoles, and other consumer electronics.

It is realized that as currently used a 1394 bus often simply connects two devices together, thus few problems are encountered if there are difficulties on the bus. It is believed, however, that the current trend is toward smaller devices that are easier to use, i.e., toward devices that use a 1394 interface. As these devices become more popular and networks of these devices become much larger and more complex, there will be a corresponding need for 1394 networks to be more reliable, to have greater connectivity and to communicate over greater distances.

At the same time, it is realized that not only is the 802.3 standard very robust because of its maturity, but also that 802.3 can be used over much greater distances then the 1394 standard. It is therefore recognized that enhanced connectivity and communication distance of 1394 devices can be provided by taking advantage of 802.3 technology. Thus, these two disparate technologies can be brought together to provide a whole that is greater then the sum of the parts. Thus, embodiments of the present invention provide both hardware and software technology that create interoperability between 1394 devices and the 802.3 standard that provides distinct advantages. For example, by connecting a 1394 device over a 802.3 network, the economy of scale of existing 802.3 networks can be leveraged.

Introduction

FIG. 1 illustrates an example of a 1394 network 10 that is useful for understanding the present invention. Those of skill in the art will appreciate that the present invention is applicable to any configuration of 1394 devices in a network (including much more complicated networks and interconnection of networks) and that the figures below are for illustrative purposes. In a preferred embodiment described in more detail below, the present invention is used for point-to-point connections, and not for devices on a bus. Network 10 includes a collection of 1394 devices including a computer 20, a television 22, a DVD player 24, and a camera 26. As explained above, other types of devices that include a 1394 interface are also possible.

As shown, each device in the network includes a physical layer 30 and a link layer 32. Those of skill in the art will appreciate that not every device in the network includes a link layer and that other layers are also possible. Cables 40, 42 and 44 connect the devices through their ports 50–55. In this example, computer 20 is a three port device while the other devices are single port devices. It will be appreciated by those of skill in the art that any of the devices may have multiple ports and/or may be connected to other devices not shown. In the prior art, cables 40–44 and their attached devices are collectively referred to as the "1394 bus" when communication takes place using 1394 protocols and 1394 standard cables. As the present invention will be explained below, any of the cables may be replaced with standard 802.3 cables and protocols, thus permitting communication over greater distances between devices.

Figure 2:
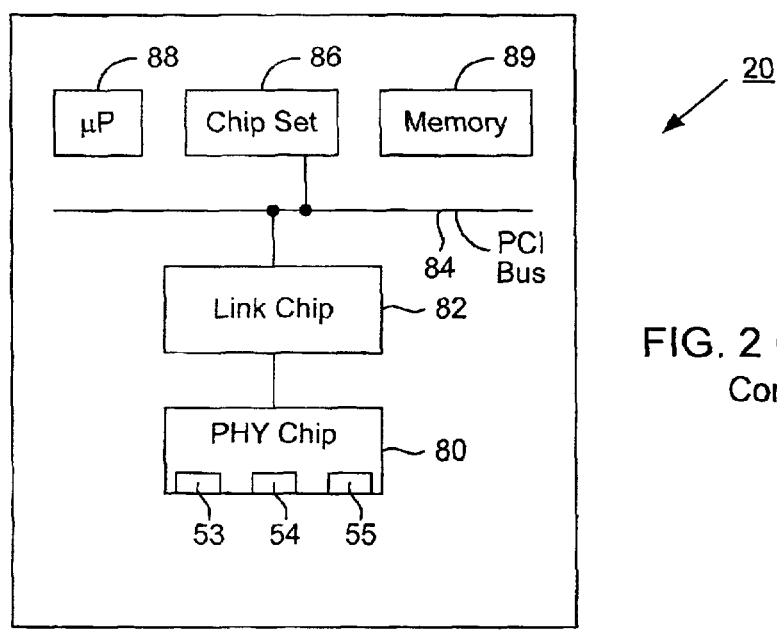
FIG. 2 illustrates in greater detail the prior art 1394 interface of the computer of FIG. 1.

FIG. 2 illustrates in greater detail the prior art 1394 interface of computer 20 of FIG. 1. The physical layer of the interface is implemented by semiconductor chip 80 (termed a "PHY"), while the link layer is implemented by a semiconductor link chip 82. These elements constitute the 1394 interface for computer 20 which also includes a PCI bus 84, chip set 86, microprocessor 88 and memory 89. The other devices of FIG. 1 have their physical and link layers implemented in a similar fashion (by a PHY and a link chip respectively) although a link chip is not always required. Of course, any of the devices of FIG. 1 may include more elaborate circuitry which is not shown. In this example, device 20 includes a three port PHY although devices having anywhere from 1 to 8 ports are possible for a PHY. As the present invention will be explained below, a novel interface device and an IEEE 802.3 PHY replace the 1394 PHY chip to allow communication over the 802.3 standard. Alternatively, the interface device may be embodied inside the 1394 link chip.

The interface device of the present invention thus allows the interoperation of an IEEE 1394 link layer device with an IEEE 802.3 physical layer device (commonly called a "PHY"). Because these devices were designed for different applications, have different physical interfaces, and operate at different speeds, the interface device provides conversion and emulation to accommodate the two different standards. For example, there are clocking differences to be resolved, data speed differences to be managed, and management requirements to be fulfilled. Clocks must be supplied for both the link layer device and the PHY, the data rate of the link (from 100 Mbps up to 800 Mbps) must be matched with the 1 Gbps rate of the PHY, and control and management signals are translated or provided.

Figure 3:
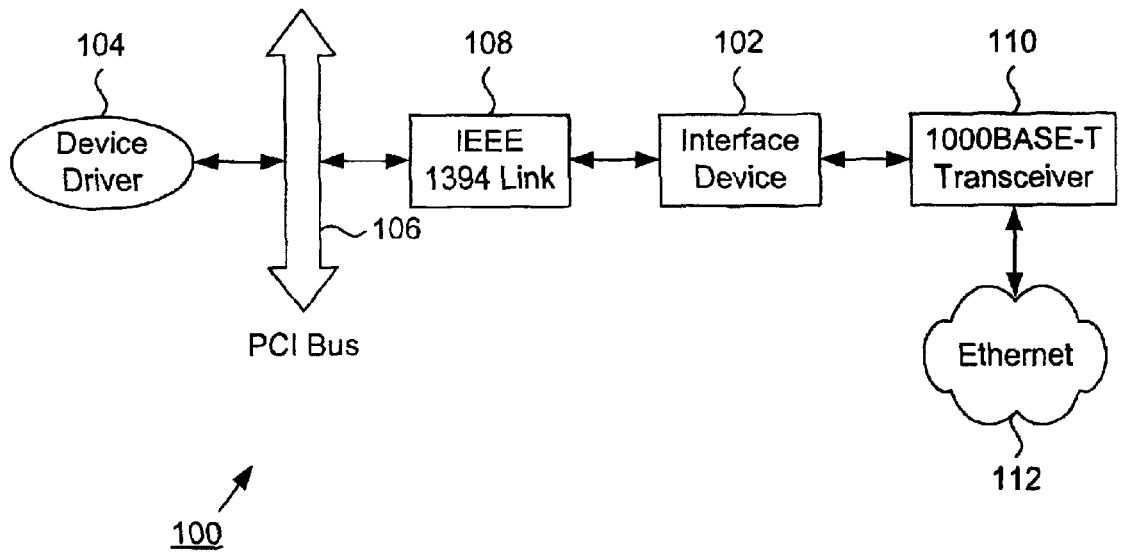
FIG. 3 is a block diagram illustrating use of a novel interface device to provide communication between a 1394 device and an 802.3 network.

FIG. 3 is a block diagram 100 illustrating use of an interface device 102 to provide communication between a 1394 device and an 802.3 network. In this example, a computer (not shown) communicates through its device driver 104 over its PCI bus 106 to an IEEE 1394 link chip 108 and to interface device 102. Communications from or to Ethernet 112 pass through a 1000BASE/T transceiver 110 and to interface device 102. As explained above, the 1394 device need not necessarily be a computer, but could be any possible 1394 device. Similarly, network 112 is based upon the IEEE 802.3 standard and follows the Gigabyte Media Independent Interface (GMII) protocol. Transceiver 110 is an example of a possible implementation of the GMII; other implementations based upon this protocol are also possible. Thus, interface device 102 connects a 1394 link controller to a transceiver using IEEE 802.3 GMII.

Figure 4:
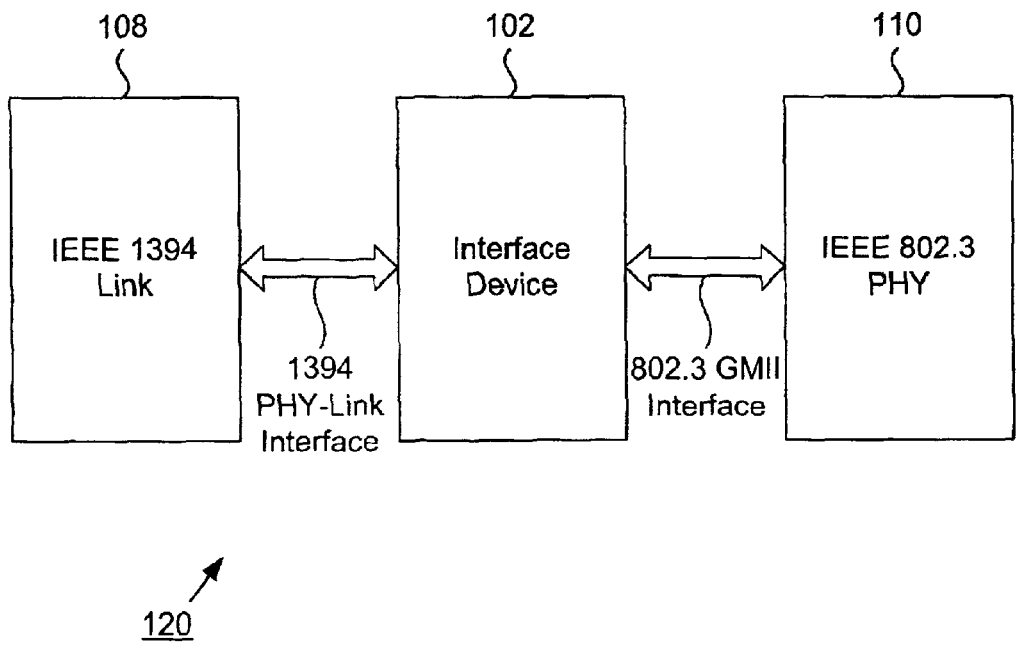
FIG. 4 is a block diagram illustrating the interfaces that the interface device uses to communicate with a 1394 device and an 802.3 network.

FIG. 4 is a block diagram 120 illustrating the interfaces that interface device 102 uses to communicate with a 1394 device and an 802.3 network. Interface device 102 communicates with link 108 using the 1394 PHY-link interface, thus appearing to the link as a 1394 PHY. Interface device 102 communicates with 802.3 PHY 110 over an 802.3 GMII interface, thus appearing to the PHY as an 802.3 MAC.

Interface device 102 functions as a low-latency interface translator to allow an Ethernet transceiver to perform most of the physical layer functions of an IEEE 1394 PHY. This allows 1394 packets (both asynchronous and isochronous) to traverse a 100 meter 802.3 full duplex, physical link. Preferably, interface device 102 does not include a repeater to support a complete IEEE 1394 bus. Preferably, only point-to-point connections are supported. Interface device 102, however, is designed to perform a complete 1394 PHY emulation to the 1394 link. No external device (e.g., memory, CPU, PLD) is required to insure that the 1394 link inter-operates fully with the interface device and believes it is an IEEE 1394 PHY.

Among other features, the interface device supports an 8-bit IEEE 802.3z GMII, emulates the register set of an IEEE 1394a PHY, and supports an 800 Mb link. Further, the interface device emulates the self-ID, tree-ID, and bus arbitration behavior of a 1394 PHY. The interface device responds to link requests, forwards link transmit data to the GMII interface, and receives GMII data, synchronizes the data with SCLK and forwards the data to the link.

Figure 5:
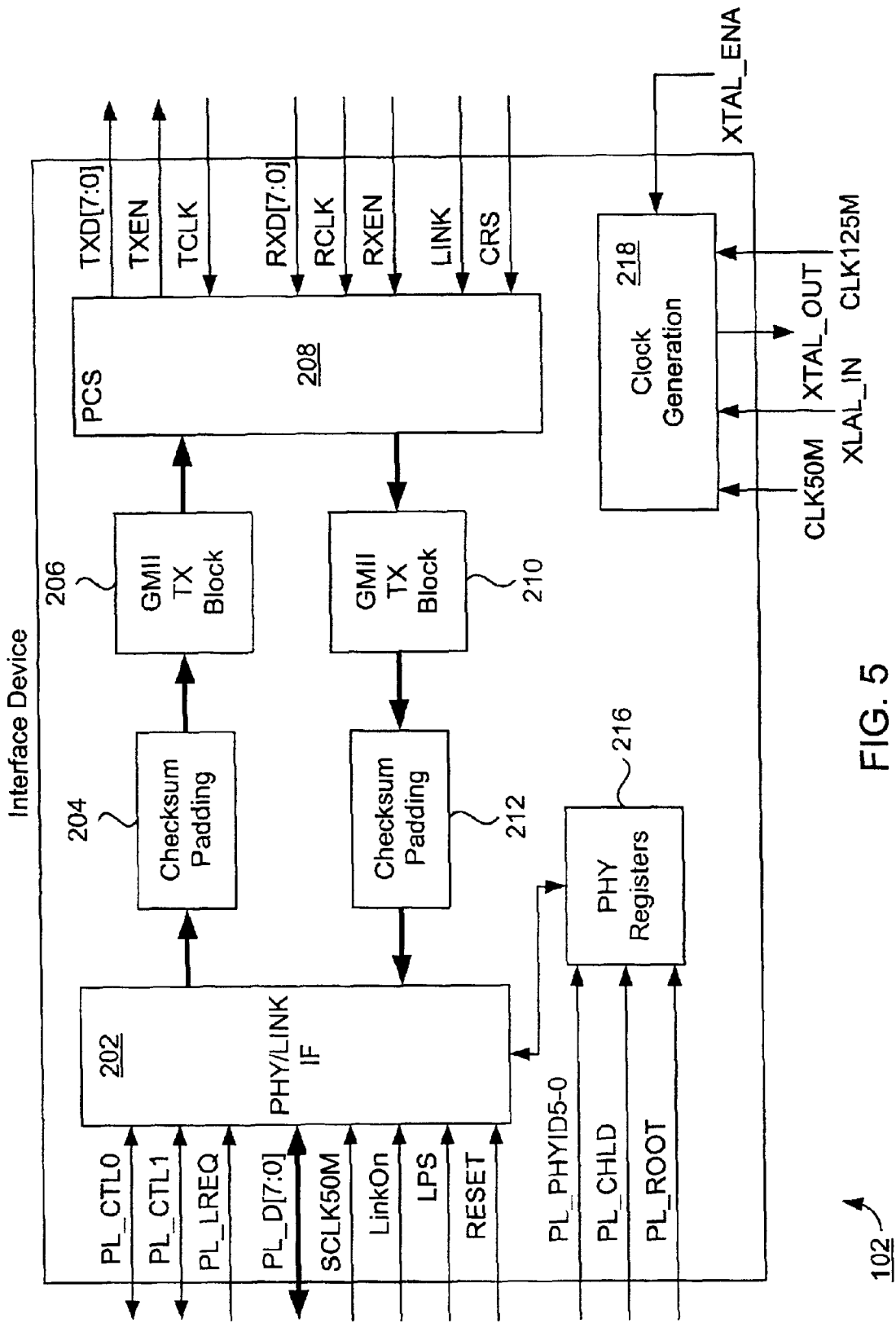
FIG. 5 illustrates the interface device in greater detail.

FIG. 5 illustrates interface device 102 in greater detail. Signals to and from the 1394 link pass through the PHY/link interface 202 and outgoing data is padded in checksum padding unit 204. GMII transmit block 206 passes data to the physical coding sublayer (PCS) 208 for transmission to the 802.3 PHY. PCS 208 is implemented as per the 802.3 standard. Received data passes through PCS 208, through GMII receive block 210, and into checksum stripping unit 212. Data is then received by the interface 202 before being passed on to the 1394 device.

Interface 202 provides complete access to interface device 102 through the standard link-PHY interface specified by 1394. All access to the internal register set as well as the physical layer is carried out through this interface. Transmit and receive blocks 206 and 210 provide an interface to the GMII transmitter and receiver, respectively, and function as a serializer and deserializer, respectively. Included within units 204 and 212 (or within blocks 206 and 210) are FIFO buffers that provide minimal internal storage to handle movement of data across asynchronous clock boundaries. Registers 216 emulate most of the functionality of a standard 1394 PHY. Access to this register set is through the interface 202. Clock generation unit 218 creates the clocks used by the PHY/link interface and GMII clocks.

FIG. 6 lists pin descriptions for the interface device 102 of FIG. 5.

PHY Registers

As noted above, interface device 102 emulates necessary registers of a 1394 PHY to provide compatibility with a 1394 link. In the below figures, all of the "P" bytes are to be programmed by pin selection. All of the "X" bytes are read and write for the link to use.

FIG. 7 illustrates the contents of base registers 0000-0011. FIG. 8 describes the fields of the base registers of FIG. 7. FIG. 9 illustrates the contents of port status registers 1000-1111. The "port select" byte in the base register (of FIG. 7) selects the port. For ports 1 and 2, all of the registers in this page read 0. For port 0, the register is defined as shown in FIG. 10.

FIG. 11 illustrates the contents of the vendor ID register (page 1). FIG. 12 illustrates the content of the vendor ID register (page 7). FIG. 13 describes the field of the vendor ID registers.

Clock Generation and Timing

Figure 14:
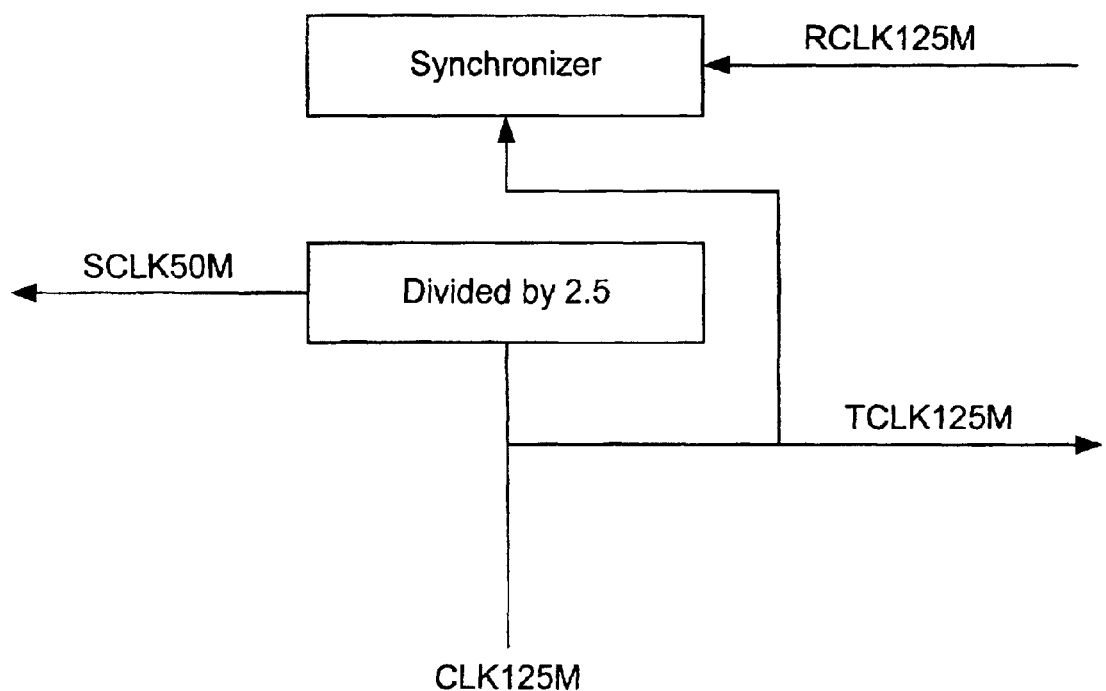
FIG. 14 illustrates clock generation of the interface device.

FIG. 14 illustrates clock generation of interface 102. In the S100/S200/S400 mode, the PHY/link interface runs SCLK at 50 MHz. The GMII has two clocks PCLK and RCLK, both of which run at 125 MHz. In S800 mode, the interface device uses 1394 protocols and a 16-bit data bus running at 50 MHz. All circuitry in the 1394 domain is clocked using an internal version of the SCLK50M signal. All circuitry in the 802.3 domain is clocked using the internal versions of either the RCLK125M or TCLK125M signals, depending whether the function is receive or transmit.

Figure 15:
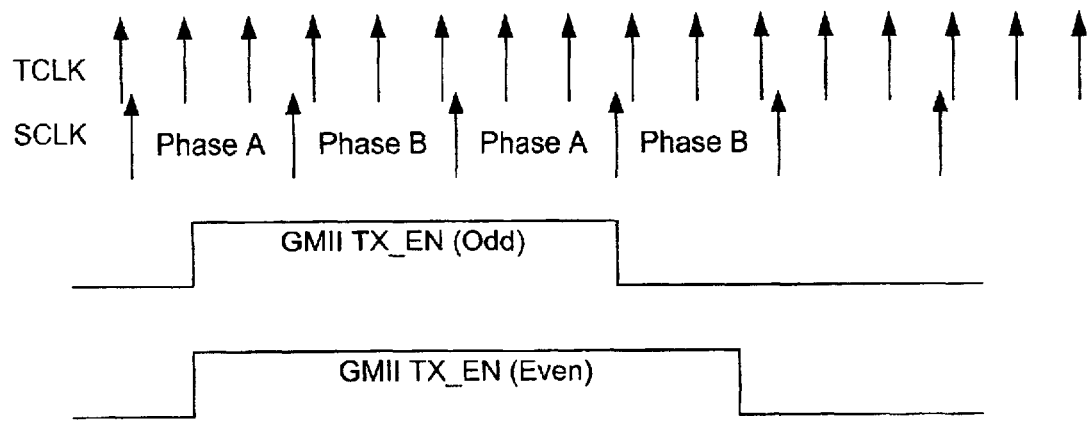
FIG. 15 illustrates the phase relationship between TCLK and SCLK.

FIG. 15 illustrates the phase relationship between TCLK and SCLK. As shown, the SCLK50M and TCLK125M clocks have a fixed phase relationship. During phase A, each SCLK period contains two rising edges of TCLK. During phase B, each SCLK period contains three rising edges of TCLK. A transmit packet starts with phase A and finishes with phase A (odd number of bytes) or phase B (even number of bytes).

Figure 16:
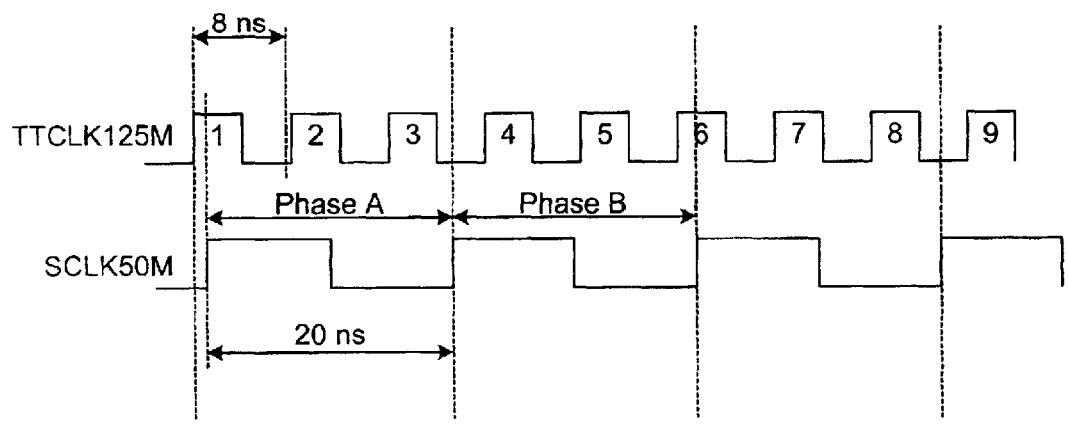
FIG. 16 illustrates skewing between TCLK and SCLK.

FIG. 16 illustrates skewing between TCLK and SCLK.

Transmit Function

During transmit, data is sent from a 1394 device through interface device 102 out over an 802.3 network. The below section describes link speed selection, preamble encoding, data padding schemes and bus reset packets. To indicate the speed of the link data, a preamble byte is first transmitted. The preamble consists of four identical preamble bytes as shown in Table 1.

TABLE 1

Preamble Encoding of Data Link Speed

| Speed | Preamble |
|---|---|
| S100 | 10101000 |
| S200 | 10101001 |
| S400 | 10101010 |
| S800 | 10101011 |

Data padding is used to make up for the difference in speeds between the 1394 link and the 802.3 PHY. As there are four possible speeds for the link, there are four data padding modes, one each for S800, S400, S200 and S100.

In S800 mode, four bytes of S800 data are transmitted during a 5-byte interval in the GMII interface. This padding works with either a TCLK50M using a 16 bit wide link interface or a TLCK100M interface with an 8-bit wide interface. In this mode, the first two bytes received from the link are data(7:0) and data(15:8). These two bytes of data are transmitted at 125 MHz during phase A. The next two bytes received from the link are data(23:16) and data(31:24). These two bytes of data are transmitted at 125 MHz during phase B. A third byte transmitted, data(39:32), is a pad byte used for error detection and correction. Any suitable error detection and correction scheme may be used and will be sufficient to handle single byte errors.

For the S400 mode, note that during phases A and B, there are two SCLK50M and five TCLK125M rising edges. In this mode the first byte received from the link is data(7:0) and the second byte is data(15:8). These two bytes of data are transmitted at 125 MHz during phase A. There are three bytes of data transmitted during phase B. Each of the two original bytes are transmitted again along with a pad byte to provide error correction. Alternatively, it is possible to send the first byte of data received from the link twice during phase A and to send the second link twice during phase B. Preferably, the third byte transmitted during phase B is an XOR function of the first and second bytes received from the link. This technique paces the 400 Mbps link though a Gigabit channel without the need for buffering.

In the S200 mode, the interface device extends each 4-bit portion received from the link into eight bits. This extension is performed by simply duplicating the four bits in each half of a byte. In other words, the first half and the second half of the byte to be transmitted will be the same. This byte is then transmitted as described with respect to the S400 mode above.

In the S100 mode, the interface device extends each two bits received from the link into a byte by simply duplicating the two bits four times. In other words, each successive two bits of the byte to be transmitted will be the same. This byte to be transmitted is then sent as described with respect to the S400 mode above.

A bus reset packet is sent as a response to the assertion of a high active bus reset bit. The bus reset packet consists of four preamble bytes at S100 speed, followed by four reset bytes of alternating 1's and 0's.

Receive Function

This section describes speed determination, data packet end coding and bus reset packet encoding with respect to receiving data. Receive refers to the function in which data is received by the 802.3 PHY and transmitted to the 1394 device using interface device 102. Preferably, the receiver synchronizes the clock such that RXDV starts with phase A. Preferably, speed is determined by decoding the four identical preamble bytes and using majority rule. Every packet will have one of the following speeds: S800, S400, S200 or S100.

Data packet decoding follows naturally from the description of data padding given above for each mode. Thus in S800 mode the first two bytes are received during phase A, the next two bytes are received during phase B, and the fifth byte received during phase B is used for error correction. In S400 mode the first byte is received during phase A (along with a duplicate byte for error correction) and the second byte is received during phase B (along with duplicate byte for error correction).

Both the S200 and S100 mode data packet decoding are similar to the S400 mode decoding. The link interface operates at the same TCLK50M speed and delivers only half as many data bytes in each byte transfer. In S200, the upper four bits are duplicates of the lower four bits. During phase A a first byte is received (having duplicate upper and lower four bits) and error correction is performed using the first two bytes received from the 802.3 PHY. During phase B the third byte received from the PHY becomes the second byte to be transmitted to the link, and error correction is performed using the final third, fourth and fifth bytes received from the PHY.

In S100 mode, the upper six bits are duplicates of the lower two bits. During phase A the first byte received from the PHY becomes the first byte destined for the link and error correction is performed using the first and second bytes received from the PHY. During phase B, the third byte received from the PHY becomes the second byte destined for the link, and error correction is performed using the third, fourth and fifth bytes received from the PHY.

Automatic and Manual Configuration

Automatic configuration refers to root selection, PHY ID address selection and parent/child selection. For root selection, if a node's "force root" bit is set, that node is a root. If no such bit is set in either node, then the node with PHY ID having a value of 1 becomes the default root. If the "force root" bits of both nodes are set, then the two nodes will arbitrate for root status.

Arbitration for root status occurs as follows. As soon as a connection is detected either interface device with its "force root" bit set sends out a 10-byte contention packet. If the receiving node also has its "force root" bit set, and has also sent a contention packet, then both nodes back off for a random amount of time based upon values in their 8-bit counters. This back off arbitration continues until one node receives a contention packet while not yet sending one. This node then sends out a one byte contention finish packet.

Regarding address selection, in point-to-point configurations, addressing is a matter of deciding which node will be the master and which is going to be the slave. The 10-bit bus address is arbitrary (unless mandated by the link) and there are only two node identifiers: 0 and 1. In bus configurations, the arbitration will follow the IEEE 1394 standard. Once the root is determined, the PHY ID is automatically assigned. The root PHY ID will be 000001 and the remaining nodes PHY ID will be 000000. Regarding parent/child selection, the root will be the parent and the remaining node (leaf) will be the child.

Regarding manual configuration, each interface device is manually configured before the power on reset: PHY ID selection; root node selection; and parent/child port selection. As noted above, in a two node/two port set up, one node is PHY ID=0 and the other is PHY ID=1. One node is selected as the root and the other as the leaf The port associated with the root node is selected as the child port, while the port associated with the leaf node is selected as a parent port.

Bus Reset Emulation

The bus reset signal is a function of the multi-point operation of a 1394 bus. In a point-to-point configuration, however, the bus reset serves only one purpose—to indicate when two nodes have been connected. The link, however, can use the bus reset signal for its own purposes, such as notifying others of a change of status in one of its clients. The interface device provides proper emulation to support this action. The interface device will start a bus reset emulation on two occasions; after a link connection/disconnection has been detected; and when the register bit IBR is set by the link.

For a link connection, the interface device performs two steps after a link connection is detected. First, the interface device sends one root self ID packet to the link. This self ID packet represents the node itself. FIG. 17 illustrates one such root self ID packet. Secondly, the interface device sends one non-root self ID packet to the link. This self ID packet represent the node from the other end. FIG. 18 illustrates one such non-root self ID packet.

The interface device performs a single step after a link disconnection is detected. The interface device sends a root self ID packet to the link. This self ID packet represents the node itself. FIG. 19 illustrates one such root self ID packet sent following a disconnection.

Arbitration

Even with only two nodes, arbitration is still needed for gaining control of the bus. In addition, the sub-action gap and the arbitration reset gap need to be decoded and conveyed to the link. The link uses the sub-action gap to recognize an isochronous interval and the start of an asynchronous interval. Gap identification is used for determination of the end of the isochronous interval and starts of the asynchronous interval. In the interface device, the CRS line of the GMII is used to determine the idle time of the bus. For proper functioning of the bus, the arbitration reset gap and the sub-action gap are constrained by the following equation: $2d<A-S$. In this equation "2d" refers to the round trip delay of the bus, "A" refers to the asynchronous reset gap and "S" refers to the sub-action gap.

As there will only be two nodes the sub-action gap can be fixed for some value, for example 0.5d. By using the above equation, the arbitration reset gap can be fixed at 3d. The gap count will give the round trip delay of the bus and is programmed by the bus manager. The gap count will start when CRS is deasserted, on assertion of CRS it will get reset. When the gap count exceeds a particular gap value the link will be notified via a status transfer. Table 2 below lists the relationship of these parameters using this example.

TABLE 2

Gap Count Parameters

| Gap Count | Round trip delay Ns | Sub-action gap Ns | Arb-reset Gap Ns |
|---|---|---|---|
| 0 | 320 | 160 | 960 |
| 1 | 640 | 320 | 1920 |
| 2 | 960 | 480 | 2880 |

Arbitration signaling describes the request and grant process before transmission of packets. When there is a request from the link to send data, if the arbitration enable bit is set then the PHY sends a 10-byte bus request packet to the root node and resets the arbitration enable bit. On arbitration reset gap the arbitration enable bit becomes set. The root node in turn grants permission to the node by sending a grant packet which is determined by the following algorithm:

```
If Node1_req then // Root node has more priority
        Node1_Gnt
        If sub_action_gap then
                Remove Node1_Gnt
        End if
Elseif node0_req then
        Node2_Gnt
        If sub_action_gap then
                Remove Node1_Gnt
        End if
End if
```

Status Transfer

The interface device initiates a status transfer to the link after a bus resets or when it finds a sub-action gap or an arbitration reset gap. Otherwise, the interface device only transfers status in response to a link read request.

Figure 20:
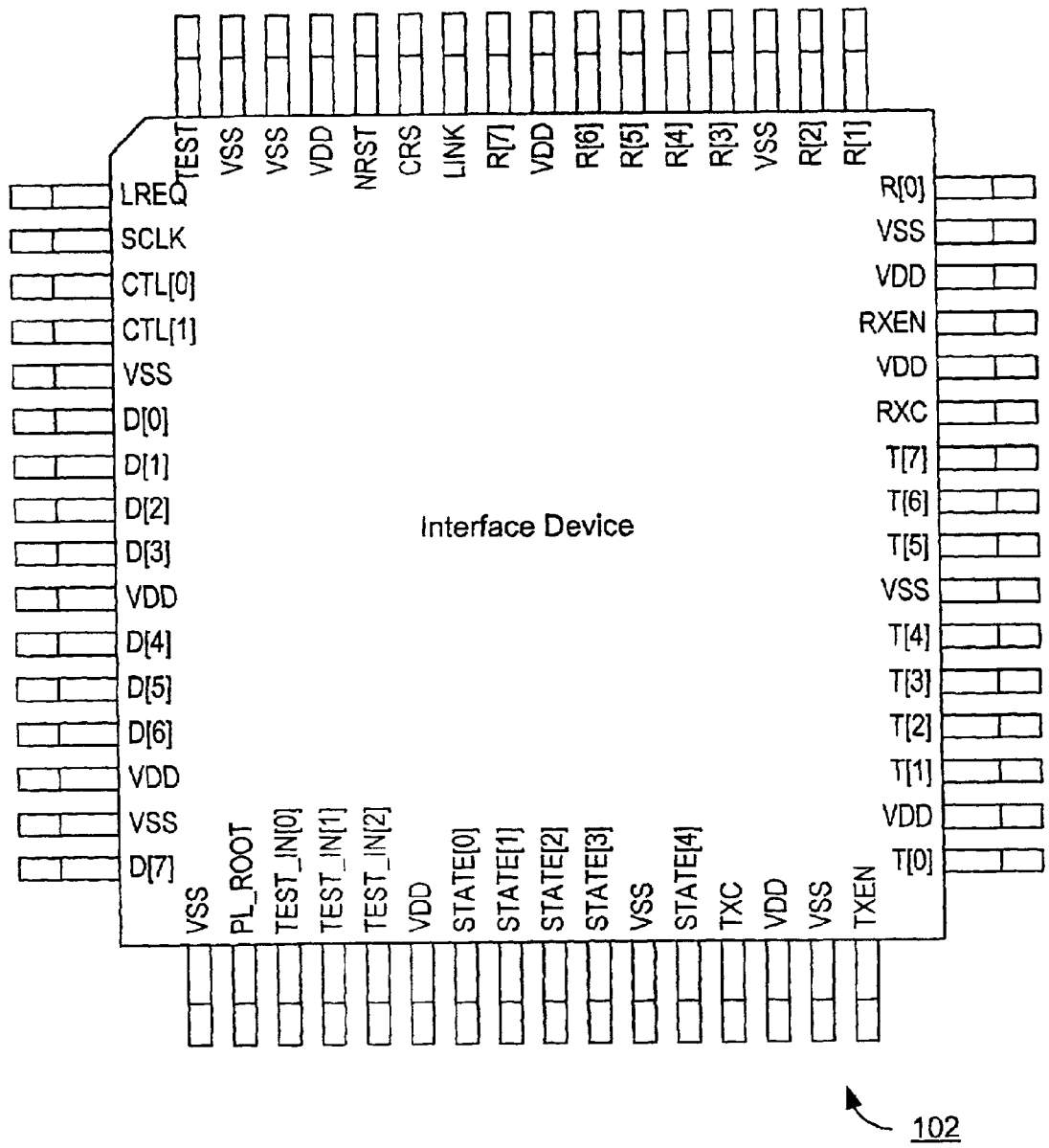
FIG. 20 illustrates a pinout of an interface device embodied in a discrete integrated circuit.

FIG. 20 illustrates a pinout of an interface device 102 embodied in a discrete integrated circuit. Of course, this is one possible implementation among many. Further, the interface device need not be a discrete chip, but may also be embodied inside a 1394 link chip (in which case the link would have a GMII connection to an 802.3 PHY), or even inside an 802.3 PHY (in which case the PHY would have a 1394 PHY-link interface to a link chip).

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method for receiving data in a 1394 device from an 802.3 network, said method comprising:

transmitting said data from said 802.3 network to an interface device;

receiving said data in said interface device using a Gigabyte Media Independent Interface (GMII) transceiver;

deserializing said data;

unpadding said data to compensate for a speed difference;

transferring data from said interface device to a 1394 device using an emulation of a 1394 PHY; and receiving said data in said 1394 device.

2. A method as in claim 1 wherein said unpadding compensates for the speed difference between the speed of a 1394 link controller of said 1394 device and the speed of said 802.3 network.

3. A method as in claim 1 wherein said unpadding includes determining the speed of a 1394 link controller of said 1394 device, and implementing a mode depending upon the speed of said 1394 link controller.

4. A method as in claim 1 wherein said receiving includes receiving said data in a 1394 link controller.

5. A method for transmitting data from a 1394 device over an 802.3 network, said method comprising:

transferring data from a 1394 link controller of said 1394 device to an interface device;

receiving said data in said interface device by emulating a 1394 PHY;

padding said data to compensate for a speed difference;

transforming said data to be compatible with the 802.3 standard sing a serializer and a physical coding sublayer; and transmitting said data over said 802.3 network.

6. A method for transmitting data from a 1394 device over an 802.3 network, said method comprising:

transferring data from a 1394 link controller of said 1394 device to an interface device;

receiving said data in said interface device by emulating a 1394 PHY;

padding said data to compensate for a speed difference, including determining the speed of said 1394 in controller and implementing a padding mode depending upon the speed of said 1394 link controller;

transforming said data to be compatible with the 802.3 standard; and transmitting said data over said 802.3 network.

\* \* \* \* \*

UNITED STATES PATENT AND TRADEMARK OFFICE
CERTIFICATE OF CORRECTION

PATENT NO.    : 6,813,651 B1
DATED         : November 2, 2004
INVENTOR(S)   : Smith et al.

It is certified that error appears in the above-identified patent and that said Letters Patent is hereby corrected as shown below:

Column 3,
Line 55, change "EEC 61883-1" to -- IEC 61883-1 --.

Column12,
Line 13, change "standard sing" to -- standard using --.
Line 25, change "1394 in controller" to -- 1394 link controller --.

Signed and Sealed this

Nineteenth Day of April, 2005

JON W. DUDAS
*Director of the United States Patent and Trademark Office*